United States Patent
Kinn et al.

(10) Patent No.: US 8,227,654 B2
(45) Date of Patent: Jul. 24, 2012

(54) AROMATIC HYDROCARBON PURIFICATION METHOD

(75) Inventors: Timothy F. Kinn, Houston, TX (US); Michael C. Clark, Chadds Ford, PA (US)

(73) Assignee: Exxonmobil Chemical Patents Inc., Houston, TX (US)

( * ) Notice: Subject to any disclaimer, the term of this patent is extended or adjusted under 35 U.S.C. 154(b) by 191 days.

(21) Appl. No.: 12/871,706

(22) Filed: Aug. 30, 2010

(65) Prior Publication Data

US 2011/0060177 A1  Mar. 10, 2011

Related U.S. Application Data

(60) Provisional application No. 61/240,424, filed on Sep. 8, 2009.

(51) Int. Cl.
*C07C 2/58* (2006.01)

(52) U.S. Cl. ........ 585/804; 585/805; 585/323; 585/467; 585/951

(58) Field of Classification Search .......... None
See application file for complete search history.

(56) References Cited

U.S. PATENT DOCUMENTS

| | | |
|---|---|---|
| 6,368,496 B1 | 4/2002 | Brown et al. |
| 6,500,996 B1 | 12/2002 | Brown et al. |
| 6,781,023 B2 | 8/2004 | Brown et al. |
| 7,084,318 B2 * | 8/2006 | Ghosh et al. .................. 585/467 |
| 7,214,840 B2 | 5/2007 | Lo et al. |
| 8,115,041 B2 * | 2/2012 | Ghosh et al. .................. 585/467 |
| 2006/0270866 A1 | 11/2006 | Sapienza et al. |

OTHER PUBLICATIONS

J. Cejka et al., "*Disproportionation of Trimethyl Benzenes Over Large Pore Zeolites: Catalytic and Adsorption Study*", Applied Catalysis A: General, 2004, vol. 277, No. 1-2, pp. 191-199.

T-C Tsai et al., "*Disproportionation and Transalkylation of Alkylbenzenes Over Zeolites Catalysts*", Applied Catalysts A: General, 1999, vol. 181, No. 2, pp. 355-398.

U.S. Appl. No. 12/756,471, filed Apr. 8, 2010, Brown.
U.S. Appl. No. 12/758,388, filed Apr. 12, 2010, Brown.
U.S. Appl. No. 12/758,688, filed Apr. 12, 2010, Brown et al.

* cited by examiner

*Primary Examiner* — Tam M Nguyen
(74) *Attorney, Agent, or Firm* — Andrew B. Griffis

(57) ABSTRACT

In a process for reducing the amount of benzene produced in a startup procedure for purification of an aromatic feedstream, the improvement comprising a start-up procedure including contacting said catalyst with said feedstream at elevated LHSV for a period of time sufficient to reduce benzene and/or toluene levels to a predetermined level, and proceeding under normal operational conditions.

11 Claims, 4 Drawing Sheets

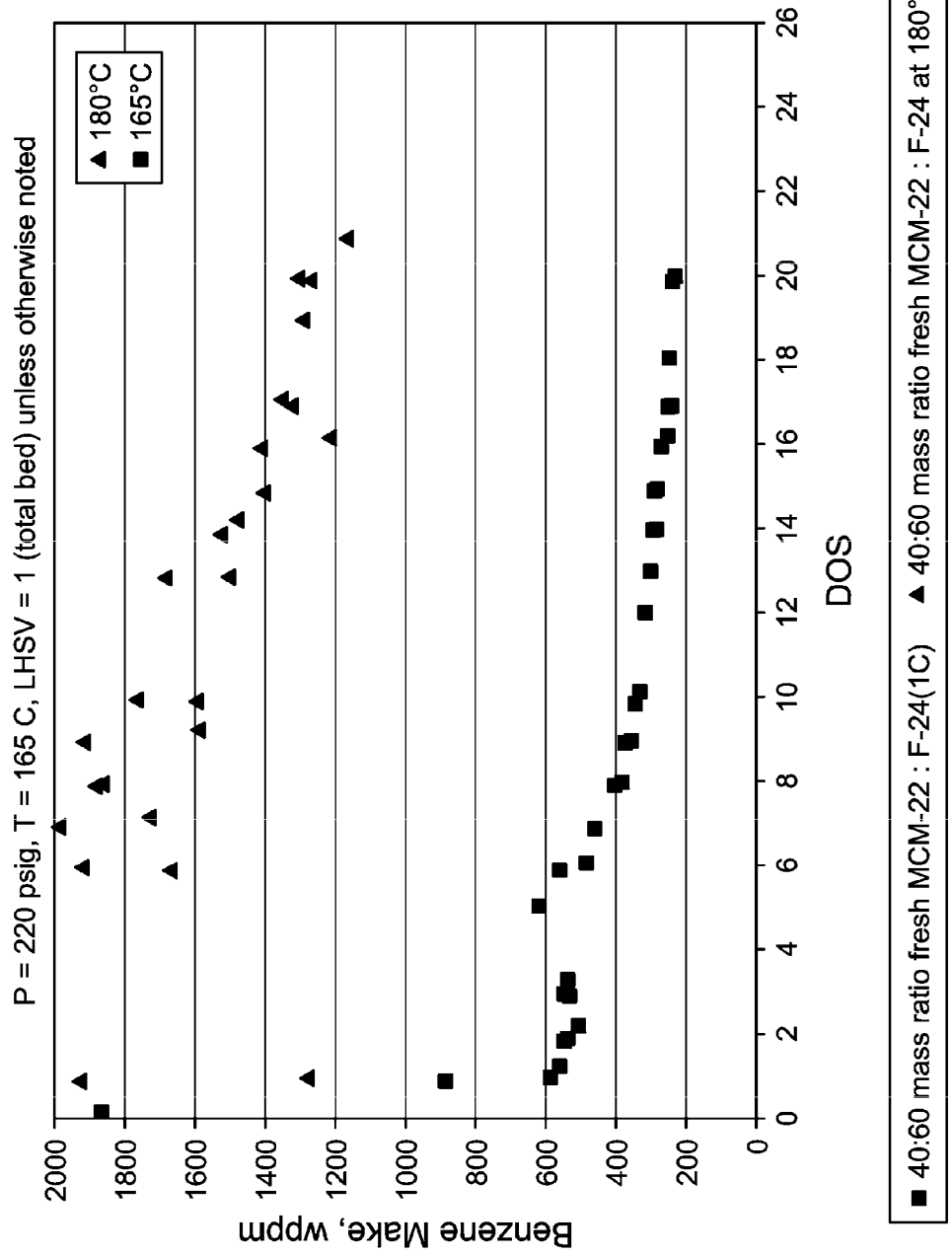

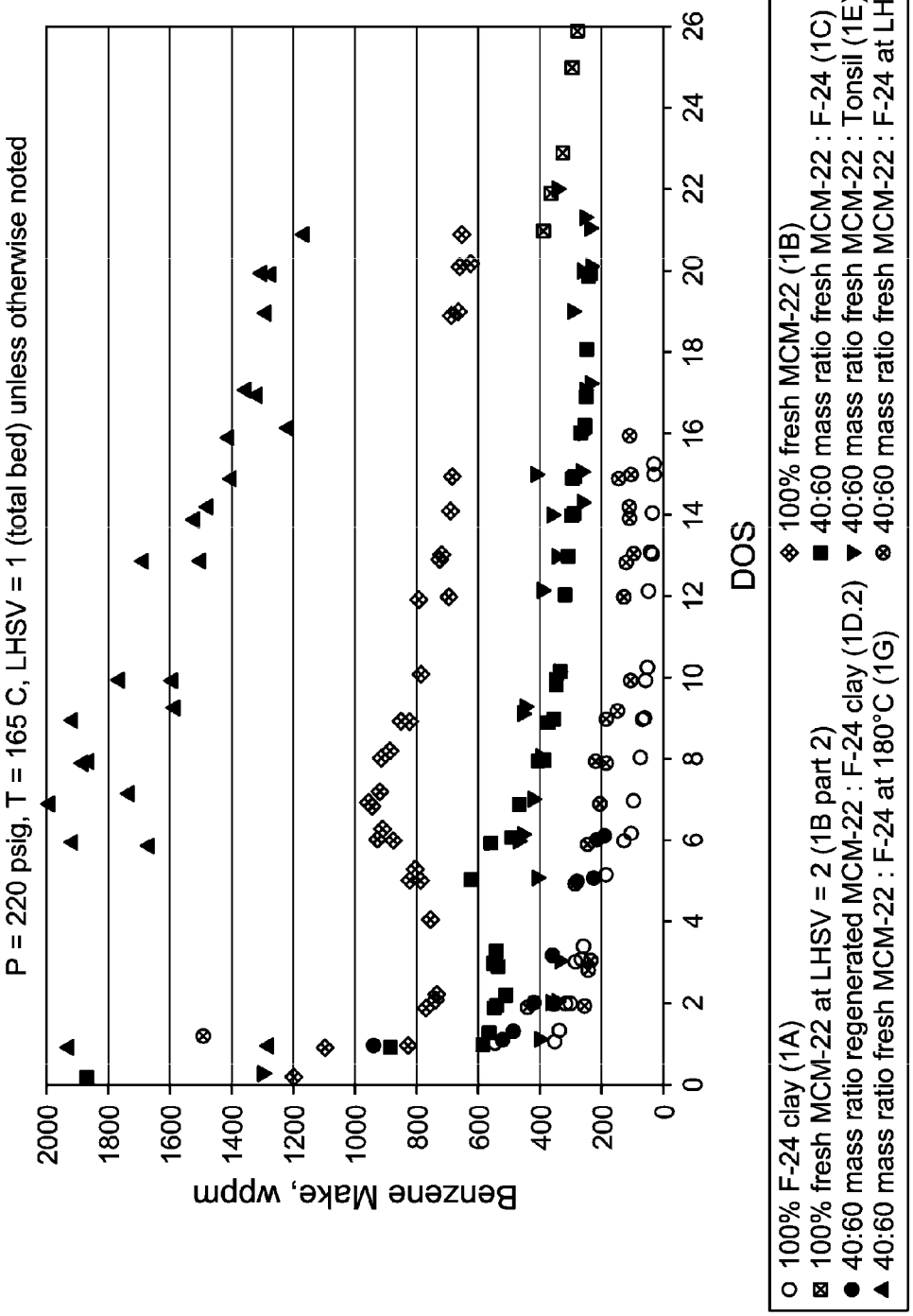

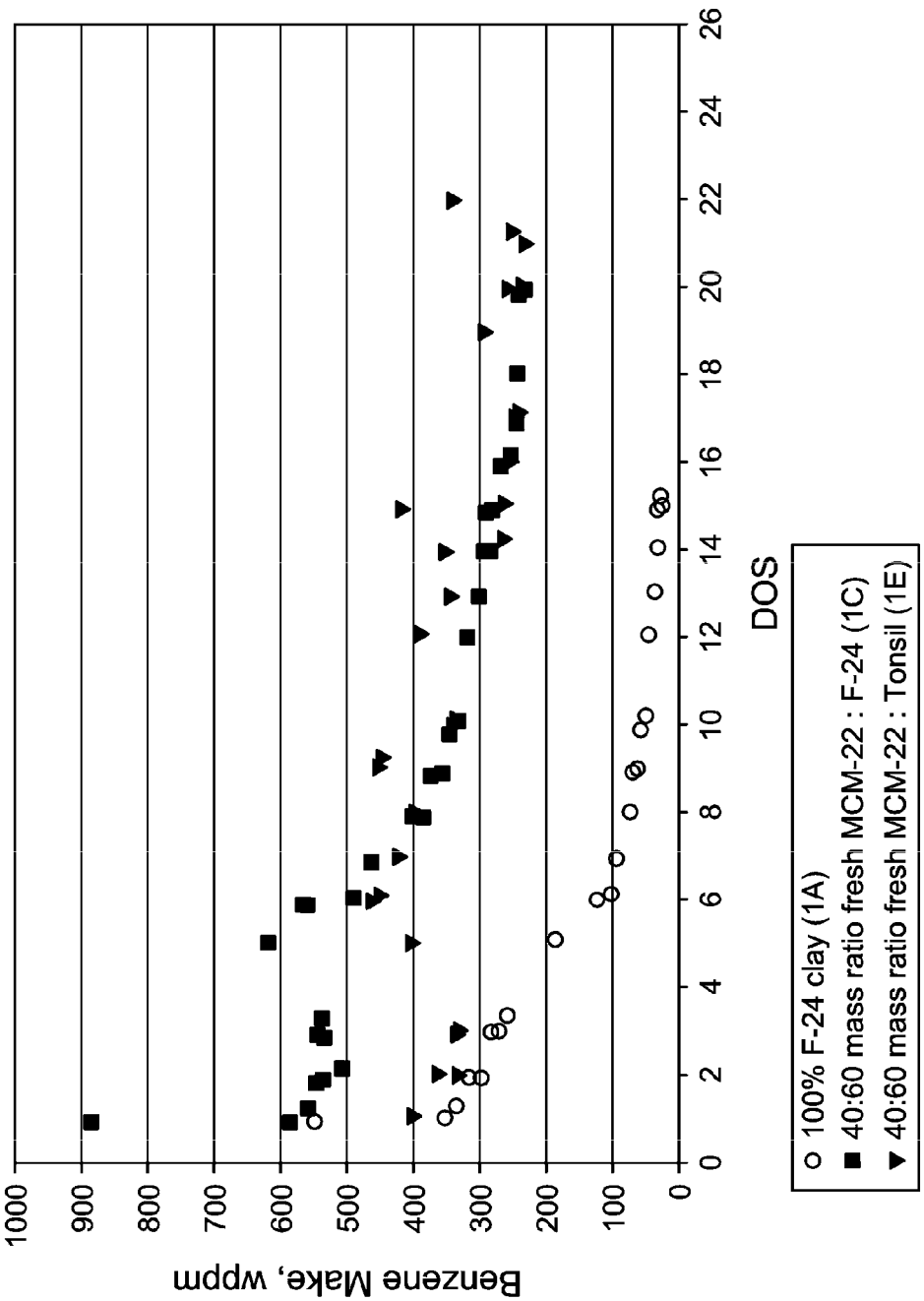

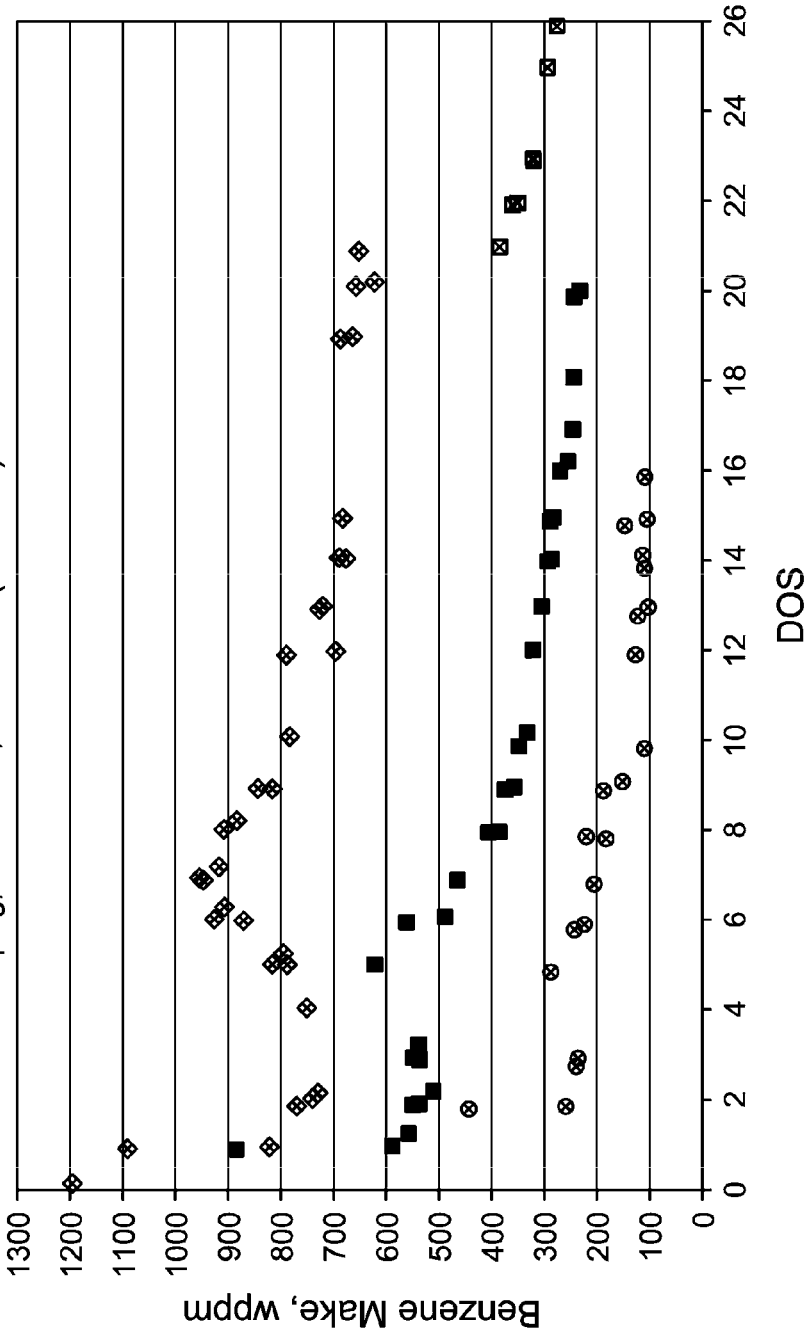

AROMATIC HYDROCARBON PURIFICATION METHOD

CROSS REFERENCE TO RELATED APPLICATIONS

This application claims the benefit of Provisional Application No. 61/240,424, filed Sep. 8, 2009, the disclosure of which is incorporated by reference in its entirety.

FIELD OF THE INVENTION

The invention relates to purification of aromatic streams.

BACKGROUND OF THE INVENTION

In petroleum processing, aromatic streams are derived from processes such as naphtha reforming and thermal cracking (pyrolysis). These aromatic streams also contain undesirable hydrocarbon contaminants including mono-olefins, dienes, styrenes and heavy aromatic compounds such as anthracenes.

The aromatic streams are used as feedstocks in various subsequent petrochemical processes. In certain of these processes, such as para-xylene production, e.g., from an aromatic stream containing benzene, toluene and xylenes (BTX) or toluene disproportionation, hydrocarbon contaminants cause undesirable side reactions. Therefore the hydrocarbon contaminants must be removed before subsequent processing of the aromatic streams.

Moreover, the shift from high-pressure semiregenerative reformers to low-pressure moving bed reformers results in a substantial increase in contaminants in the reformate derived streams. This in turn results in a greater need for more efficient and less expensive methods for removal of hydrocarbon contaminants from the aromatic streams.

Undesirable hydrocarbon contaminants containing olefinic bonds are quantified by the Bromine Index (BI). Undesirable olefins, including both dienes and mono-olefins, have typically been concurrently removed from aromatic streams such as BTX by contacting the aromatic stream with acid-treated clay. Other materials, e.g., zeolites, have also been used for this purpose. Clay is an amorphous naturally-occurring material, while zeolites used for this purpose generally are synthesized and are therefore more expensive. Both clay and zeolites have very limited lifetimes in aromatics treatment services. The length of service correlates with the level of bromine reactive impurities ("BI-reactive" impurities or contaminants) in the feedstream. BI-reactive contaminants rapidly age both clay and zeolites. Indeed, although clay is the less expensive of the two alternatives, large aromatic plants can spend a significant amount of money on clay. Furthermore, since zeolites are considerably more expensive than clay, their use in removing hydrocarbon contaminants can only be justified by dramatically improved stability in aromatics treatment so that their cycle length is practical.

U.S. Pat. Nos. 6,368,496 and 6,781,023 teach bromine reactive hydrocarbon contaminants are removed from aromatic streams by first providing an aromatic feedstream having a negligible diene level. The feedstream is contacted with an acid active zeolite catalyst composition under conditions sufficient to remove mono-olefins. The aromatic stream may be pretreated to remove dienes by contacting the stream with clay, hydrogenation or hydrotreating catalyst under conditions sufficient to substantially remove dienes but not mono-lefins.

Other relevant references include U.S. Pat. Nos. 6,500,996; 7,214,840; and U.S. Patent Application No. 2006/0270866.

Although zeolites have proven equal or superior to clay in many commercial applications, clay has at least one remaining advantage. The clay generally produces lower levels of toluene and benzene byproducts. These byproducts are produced in clay treaters treating aromatic feeds comprising xylenes and higher aromatics. They are believed to be produced by transalkylation reactions. The zeolite catalyst is apparently more active than clay for aromatics transalkylation at constant olefin removal levels resulting in higher levels of benzene and toluene impurities in the reactor product. There is a need for methods to improve the selectivity of zeolite catalysts.

Following standard clay start-up procedures, the zeolite catalyst is first dewatered ("dried") using available unit feedstock at the operating temperature of the parallel reactor that is on-stream, to a predetermined level, such as to a point where the water level in the effluent is <1000 ppm. Once this point (or some other desired level) is reached, the entire unit feedstock is directed to the reactor with dewatered, fresh catalyst so that the parallel reactor is ready to be brought off line and reloaded with fresh zeolite catalyst (or clay). This results in relatively high selectivity to benzene and toluene impurities.

Recently, an improved start up procedure was disclosed in U.S. Provisional Patent Application Ser. No. 61/171,553, filed Apr. 22, 2009, wherein the zeolite catalyst is first dewatered and then fresh feedstock is flowed through the reactor at temperatures significantly below normal operating conditions, such as approximately 100° C. or less, for a predetermined period of time, such as between 0.5 to 5 days. Then the temperature of the feedstock is raised to the operating temperature.

Additionally, relevant recent disclosures include U.S. Provisional Application Ser. Nos. 61/171,549 and 61/171,559, both also filed Apr. 22, 2009. In 61/171,549, reduction of bromine index is achieved by removal of trace olefins and dienes from aromatic feedstocks using start-up conditions outside the ordinary range currently used, such as, in embodiments, the feed is heated and contacts the zeolite catalyst above temperatures currently used, such as about 210° C., and the temperature is gradually increased to between about 240 and 300° C. at the end of the cycle. In 61/171,559, a catalyst regeneration is described wherein a small amount of coke is intentionally left on the catalyst, said regeneration found to result in an improvement in the activity of the regenerated catalyst.

The present inventors have noted that when zeolite is used to treat aromatic hydrocarbon feedstreams, such as heavy reformate or isomerate, any benzene and toluene that is produced via side reactions contaminates the overhead product of the xylene fractionator, located downstream. This applies particularly to cases where the catalyst is selected from one or more zeolites selected from MCM-22, MCM-36, MCM-49, MCM-56, EMM-10 or such zeolites co-loaded with clay. This overhead stream can either be a mixed xylene product or the feed stream of the paraxylene purification unit. If the C8 aromatic product is fed to downstream processing such as a Parex™ or Eluxyl™ unit, both per se well known in the art, benzene will have an undesirable impact on the unit's adsorbent selectivity.

During the dry-out procedure when a fresh, regenerated or rejuvenataed feedstream purification unit containing zeolite ("treater") is started-up, the system will generate a relatively large amount of benzene and toluene until the catalyst and/or clay reduces in activity. The treater must be kept off-line until the benzene and toluene co-production subsides in order to meet the paraxylene adsorber and/or mixed xylene specifications. An extended dry-out period or circulating feed through the treater while it is still off-line can result in production curtailment and can have a significant undesirable economic impact.

Without wishing to be bound by theory, it is believed that the desired reaction in the treatment process includes alkylation of olefins with contained aromatics to form heavy aromatics that can be easily removed via fractionation. Competing reactions that generate benzene are transalkylation/disproportionation of EB, xylenes and C9+ aromatics to form benzene and toluene and other reaction byproducts. The present inventors have noted that the activation energy of the alkylation reactions are thought to be lower than the other, undesirable side reactions. Accordingly, the present inventors have determined that operation of the treatment unit comprising zeolite at lower temperature and higher LHSV (Liquid Hourly Space Velocity) should favor the desired alkylation reactions and inhibit the undesirable side reactions that generate benzene and toluene and indeed this phenomenon is what has been observed in operation. As a result, the undesirable co-production of benzene and toluene by the treater has been minimized by a unique start-up procedure employing relatively low temperature and/or relatively high LHSV, such a result not predictable from the prior art.

SUMMARY OF THE INVENTION

A start-up procedure has been developed to minimize benzene and toluene generation at start-of-cycle in a process for treating a feedstream to remove bromine-reactive olefinic hydrocarbons by contacting said feedstream with a zeolite catalyst, the improvement comprising a start-up procedure comprising contacting said zeolite with a feedstream at elevated LHSV and a temperature below normal operating conditions, until the moisture level in said feedstream is reduced to a predetermined level, then initiating normal operating conditions.

Preferably the start-up conditions are off-line and normal operating conditions are on-line, with respect to downstream operations, e.g., purification in a Parex or Eluxyl unit.

In embodiments, the start-up procedure includes a temperature of above 165 C and the LHSV of said feedstream is at least 80% of design or about 2 to 3 times normal operational levels.

The catalyst is preferably selected from at least one of the MWW family of zeolites.

In embodiments the catalyst is also mixed with a clay.

In embodiments the zeolite is a regenerated or rejuvenated zeolite.

In embodiments the feedstream is a heavy reformate or isomerate.

In embodiments the feedstream is a C8 aromatic product of a paraxylene purification unit or a mixed xylene product.

In embodiments the product of the zeolite purification has no more than 3,000 ppmw of benzene.

In embodiments the off-line start up procedure uses a LHSV of at least 2 times or at least 3 times the LHSV of normal, on-line operation.

In embodiments the zeolite is selected from the MWW family of zeolites, still more preferably MWW-family zeolites that have been rejuvenated or regenerated.

It is an object of the invention to lower the production of benzene and toluene produced in the zeolite treater.

These and other objects, features, and advantages will become apparent as reference is made to the following detailed description, preferred embodiments, examples, and appended claims.

BRIEF DESCRIPTION OF THE DRAWINGS

In the accompanying drawings, like reference numerals are used to denote like parts throughout the several views.

FIG. 1 illustrates effect of reaction temperature on benzene production (benzene make) at start of cycle (SOC).

FIGS. 2 and 3 illustrate effect of benzene make over various materials at start of cycle.

FIG. 4 illustrates improvement in benzene make under various conditions at start of cycle.

DETAILED DESCRIPTION

According to the invention, the aromatic hydrocarbon feedstream is contacted with feed at an elevated LHSV until the moisture level reaches an acceptable or predetermined level, preferably less than 1 wt. %, preferably 1000 ppm or less, more preferably 100 ppm or less. The feed may be recirculated.

The moisture-containing effluent is then preferably reprocessed in upstream equipment to remove the desorbed water. The upstream equipment may be distillation, adsorption or other suitable means.

Once the dry-out step is completed, if required, the treatment unit is started-up at high LHSV (at least 80% of design) and/or low temperature, approximately 165° C. The temperature can be adjusted lower if needed, for example when the benzene and toluene levels are deemed too high.

As benzene and toluene generation subsides, which may be determined by known methods such as measured by GC analysis of the reactor effluent, the temperature is ramped to the normal start-of-run operating temperature, typically 185° C., and LHSV can be adjusted to suit operational requirements, typically 1-5 LHSV.

Table 1 depicts the amount of time required to reach the benzene specification in the reactor product as a function as various catalyst materials. For example, F-24 clay requires four days on stream to meet the product benzene specification of less than 3,000 ppmw (base condition). Using the prior art treatment, the dual bed (a typical zeolite/clay mixture) 16 days on stream is required to meet the same benzene specification, whereas using a treatment according to the present invention only 4 days on stream is required to meet the same benzene specification. The temperature of the feedstream is the same in each case.

TABLE 1

| Loading | Conditions | DOS to meet Benzene specification |
| --- | --- | --- |
| Clay | Base LHSV | 4 |
| zeolite/clay Fresh | Base LHSV | 16 |
| zeolite/clay Fresh | 2 * Base LHSV | 4 |

In another embodiment of the present invention, in cases where processes downstream of the catalyst can tolerate elevated moisture levels for short periods of time and/or in the case where such downstream processes include a treatment step to remove water from the feed, the addition of water to the feed in the process of the present invention can temper the initial activity of the catalyst. In this way, the process can be started-up at higher temperatures (e.g., 185° C. instead of 165° C.) while still maintaining benzene specifications.

Aromatic feedstreams useful in the present invention can be obtained from reforming and cracking processes. The streams include, e.g., mononuclear aromatic hydrocarbons and undesirable olefins including styrenes, and the streams have an initial Bromine Index (BI) from about 100 to about 3000. The Bromine Index is an indicator of the presence of olefinic bonds. Bromine Index is determined according to ASTM D 2710-92 and is a measure of milligrams of bromine consumed by 100 grams of sample under given conditions.

The aromatics include, for example, benzene, toluene, xylene, ethyl benzene, cumene and other aromatics derived, e.g., from reformate. Reformate is separated by distillation into light reformate which is mostly benzene and toluene, and heavy reformate which includes toluene, ortho-, meta- and para-xylenes and other heavier aromatics including C9+. Some aromatic streams such as heavy reformate derived from semi-regen processes contain negligible levels of dienes as they emerge from the processing. By negligible is meant that the level is below 50 ppm, essentially diene-free or too low to be quantified. Other aromatic streams such as light reformate derived from semi-regen reformers and light and heavy reformate from CCRs (continuous catalyst regeneration) processes include detectable levels of dienes, e.g., over 50 ppm, as they emerge from the processes.

The aromatic streams to be treated according to the invention contain bromine-reactive hydrocarbon compounds in levels which interfere in subsequent aromatics processing. An objectionable level of olefinic contaminants is from about 0.05 to about 1.5 weight percent or a BI from about 100 to about 3000.

According to embodiments of the invention, use of a regenerated or rejuvenated catalyst improves the removal of olefinic contaminants in the aromatic streams so that said contaminants do not interfere in subsequent aromatics processing. The regeneration and/or rejuvenation processes do not form a part of the present invention per se but rather have been described numerous times in the prior art such as U.S. Application No. 20080029437.

It is preferred that an aromatic hydrocarbon stream to be treated to remove mono-olefins according to the invention is essentially diene-free, i.e., has a negligible level of dienes. If the aromatic stream contains dienes above these levels, the stream can be pre-treated according to the invention to remove the dienes. Dienes are more selective for catalyst deactivating coke formation than mono-olefins. Therefore, these highly reactive diene species are substantially removed over a first catalyst. One of ordinary skill in the art in possession of the present disclosure can determine the appropriate level of dienes present without more than routine experimentation. In embodiments, the amount of dienes will be less than 1000 ppm and a feed such as reformate having less than 1000 ppm dienes is preferred. Another preferred feed is one having less than 10,000 ppm total olefins, including styrenes and dienes, wherein the dienes are present in the amount of no more than 10 wt % of the total BI. Feeds having less than 1000 ppm or less than 500 ppm or less than 300 ppm or less than 100 ppm dienes are also preferred. There is no particular minimum amount of dienes that needs to be specified, however in embodiments it will be specified that dienes are present, or that dienes are present in the amount of at least 1 ppm, or 10 ppm, or 100 ppm.

The pre-treating step is conducted at temperatures preferably of about 50 or 100° F. (10° C. and 38° C., respectively) to about 500° F. (260° C.) or 600° F. (316° C.), more preferably about 150° F. (65° C.) to about 450° F. (232° C.). A weight hourly space velocity (WHSV) is preferably from about 0.1 to about 10 and the pressure is preferably about 50 psig (344.7 kPa) to about 500 psig (3447 kPa). The pre-treating is carried out in the absence of added hydrogen. Preferred catalysts for the pretreatment step include acid treated clay such as bentonite or traditional base metal-containing hydrogenation or hydrotreating catalysts such as $NiMo/Al_2O_3$, $CoMo/Al_2O_3$, $Ni/Al_2O_3$ and $Ni/SiO_2$.

The pre-treated aromatic feed is then treated over a second catalyst to substantially remove the mono-olefins. The start up procedure for treatment over the second catalyst forms the main subject matter of the present invention.

The preferred catalyst for treatment to substantially remove mono-olefins is selected from MWW family of zeolites, which are per se well known. More preferably the catalyst is MCM-22, MCM-36, MCM-49, MCM-56, EMM-10, and mixtures thereof. Such catalysts have been described in numerous patents and publications, such as U.S. Pat. No. 4,954,325; U.S. Pat. No. 5,229,341; U.S. Pat. No. 5,236,575; and U.S. Pat. No. 5,362,697.

After treatment to remove mono-olefins the resultant stream is distilled to obtain the product, which is preferred an overhead stream comprising C8 product.

In embodiments the catalyst is also mixed with a clay. Any clay suitable for processing hydrocarbons can be used, preferably Engelhard F-24 clay, Filtrol 24, Filtrol 25, and Filtrol 62, Attapulgus clay or Tonsil clay, with Engelhard F-24 clay being the most preferred. The catalyst may comprise a mixture of clay and zeolite having an outer layer of mostly clay or an outer layer of mostly zeolite or an intimate mixture of clay and zeolite, and in embodiments the proportion of zeolite: clay may range from about 5:95 to about 95:5 or 10:90 to 90:10, with a preferred range being from 30:70 to 50:50. In some embodiments no clay is present. The ratios as used herein are mass ratios unless otherwise indicated.

In embodiments the zeolite is a regenerated or rejuvenated zeolite. Such zeolites are known in the prior art per se and are discussed, for instance, in U.S. Pat. Nos. 6,900,151 and 7,517,824, and U.S. Patent Application 20080029437. It may also be fresh zeolite or a mixture of fresh, regenerated, or rejuvenated in all possible proportions. One of ordinary skill in the art in possession of the present disclosure can determine the appropriate proportions for a particular need without undue experimentation. As used herein the term "regenerated catalyst" means any catalyst that has gone through at least one regenerative process, such as an oxidative process sufficient to regenerate the catalyst, including but not limited to traditional coke burn regen. The term "rejuvenated catalyst" means any catalyst that has gone through at least one rejuvenation process, including but not limited to an inert reductive agent under conditions sufficient to rejuvenate the catalyst.

In embodiments the feedstream is a heavy reformate or isomerate. In other embodiments, the feedstream comprises a C8 aromatic product of a paraxylene purification unit or a mixed xylene product.

In an embodiments the product of the zeolite purification, after subsequent distillation downstream of the zeolite treatment to recover a C8 product, has no more than 3,000 ppmw of benzene, in embodiments no more than 2,000 ppmw of benzene, or no more than 1,000 ppmw benzene, or no more than 500 ppmw benzene.

In embodiments the start up procedure uses a LHSV of at least 2 times the LHSV of normal operation, in embodiments at least 3 times the LHSV of normal operation.

The invention may be further illustrated by reference to the figures. It will be understood that the examples described herein are merely representative and not intending to be limiting.

FIG. 1 shows the result of studies on the effect of reaction temperature on benzene production. Higher temperatures, such as 180° C. shown at the top of the graph produces significantly more benzene for longer periods of time than operation at 165° C., in the lower part of the graph.

FIG. 2 shows the result of studies on the effect of benzene make over different materials and ratios of materials at a constant temperature, except where indicated. By way of example, using F-24 clay, benzene make is reduced faster and to a lower level than other materials at constant conditions. The bar in the graph shows the effect of doubling the LHSV, that is, operation reaches equilibrium faster and benzene make is lower.

FIG. 3 illustrates that the type of clay was not important to benzene production at start-up. The important factor was the presence of the zeolite. Regardless of the clay selected, the start-up procedure according to the present invention provides an improvement by decreased benzene production. The graph also shows that F-24 is more effective than Tonsil. The Tonsil used was CO626G.

FIG. 4 illustrates the improvement on benzene make by doubling LHSV. Benzene make decreases by a factor of 1.5 when LHSV is doubled on DOS 21 (DOS is days on stream).

Trade names used herein are indicated by a ™ symbol or ® symbol, indicating that the names may be protected by certain trademark rights, e.g., they may be registered trademarks in various jurisdictions. All patents and patent applications, test procedures (such as ASTM methods, UL methods, and the like), and other documents cited herein are fully incorporated by reference to the extent such disclosure is not inconsistent with this invention and for all jurisdictions in which such incorporation is permitted. When numerical lower limits and numerical upper limits are listed herein, ranges from any lower limit to any upper limit are contemplated.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein. Thus, without intending that the invention be limited thereto, the preferred embodiments of the invention may be described as follows: in a process for treating an aromatic hydrocarbon feedstream to reduce the amount of olefinic components in said feedstream, said process comprising contacting said feedstream with a catalyst comprising zeolite and optionally clay and including: (i) a start-up procedure (preferably off-line) wherein the amount of at least one of benzene and toluene (BT) from said contacting is above an acceptable predetermined level; and (ii) an operational procedure (preferably on-line), including conditions of a predetermined LHSV and temperature of said feedstream, wherein the amount of at least one of benzene and toluene from said contacting is at or below an acceptable predetermined level; the improvement comprising said start-up procedure including an LHSV that is at least twice, preferably three times, the predetermined LHSV in said operational procedure in (ii) and at a temperature lower than the predetermined temperature in (ii) for a period of time sufficient to reduce benzene and/or toluene levels to said predetermined level in (ii); and more preferably modification including one or more of the following: wherein said predetermined benzene levels are no more than 3,000 ppmw, or no more than 1,000 ppmw, or preferably no more than 500 ppmw; wherein the catalyst is selected from MCM-22, MCM-36, MCM-49, MCM-56, EMM-10, and mixtures thereof, any one of which is preferably regenerated or rejuvenated and particularly wherein the catalyst is MCM-22, most preferably regenerated or rejuvenated MCM-22; wherein the catalyst further includes clay, such as an intimate mixture of clay and zeolite, or wherein the clay is upstream or downstream or both upstream and downstream of say zeolite (or vice versa); wherein there is also a step of isomerization, disproportionation, alkylation, or transalkylation downstream of said contacting; wherein the feedstream is derived from a heavy reformate feed, and said process further includes a step of fractionation and/or wherein said feedstream comprises isomerate from an isomerization unit; wherein the feedstream comprises C8 species; and/or wherein the process further comprising feeding said treated feedstream to an adsorption process selective for adsorption of at least one isomer of xylene downstream of said contacting.

What is claimed is:

1. In a process for treating an aromatic hydrocarbon feedstream to reduce the amount of olefinic components in said feedstream, said process comprising contacting said feedstream with a catalyst comprising zeolite and optionally clay and including:
   (i) a start-up procedure wherein the amount of at least one of benzene and toluene from said contacting is above an acceptable predetermined level; and
   (ii) an operational procedure, including conditions of a predetermined LHSV and temperature of said feedstream, wherein the amount of at least one of benzene and toluene from said contacting is at or below an acceptable predetermined level;
   the improvement comprising
   said start-up procedure including an LHSV that is at least twice the predetermined LHSV in said operational procedure in (ii) and at a temperature lower than the predetermined temperature in (ii) for a period of time sufficient to reduce benzene and/or toluene levels to said predetermined level in (ii).

2. The process of claim 1, wherein said predetermined benzene levels in (ii) are no more than 500 ppmw.

3. The process of claim 1, wherein the catalyst is selected from MCM-22, MCM-36, MCM-49, MCM-56, EMM-10, and mixtures thereof.

4. The process of claim 1, wherein said catalyst is MCM-22.

5. The process of claim 4, wherein said catalyst is regenerated MCM-22.

6. The process of claim 4, wherein said catalyst is rejuvenated MCM-22.

7. The process of claim 4, wherein said catalyst is fresh MCM-22.

8. The process of claim 1, wherein the catalyst further includes clay.

9. The process of claim 1, wherein after said contacting, passing said feedstream to a process selected from isomerization, disproportionation, alkylation, or transalkylation.

10. The process of claim 1, wherein said feedstream is derived from a heavy reformate feed, and said process further includes a step of fractionation.

11. The process of claim 1, wherein said catalyst comprises MCM-22 which has been regenerated or rejuvenated, wherein said start up procedure includes an LHSV is at least three times the predetermined LHSV in said operational procedure (ii), wherein said predetermined benzene levels in (ii) are no more than 100 ppmw, and including a step, after said contacting, of passing said feedstream to an isomerization or transalkylation process.

* * * * *